B. WILKIE.
SPRINKLER FOR FILTERING SYSTEMS, ETC.
APPLICATION FILED APR. 16, 1920.

1,409,268. Patented Mar. 14, 1922.

Inventor
Boyd Wilkie,
By his Attorneys
Mitchell & Allyn.

UNITED STATES PATENT OFFICE.

BOYD WILKIE, OF MOUNT VERNON, NEW YORK.

SPRINKLER FOR FILTERING SYSTEMS, ETC.

1,409,268.  Specification of Letters Patent.  Patented Mar. 14, 1922.

Application filed April 16, 1920. Serial No. 374,415.

*To all whom it may concern:*

Be it known that I, BOYD WILKIE, a citizen of the United States of America, residing at Mount Vernon, Westchester County, New York, have invented a new and useful Sprinkler for Filtering Systems, etc., of which the following is a specification.

My invention relates to certain new and useful spraying apparatus, particularly useful in connection with apparatus for filtering sewage.

In many sewage disposal works, it is customary, in order to prevent pollution of streams, to filter the sewage water, and this is accomplished by discharging the sewage water upon a filtering bed, by means of which, the filtering action is secured, so that the water discharged into a stream will be free from pollution.

In my former Patent #968,015 of August 23, 1910, I have disclosed an improved means for splashing or spraying the water of a substantial area, and the present invention constitutes an improvement in that part of the apparatus.

Figure 1:
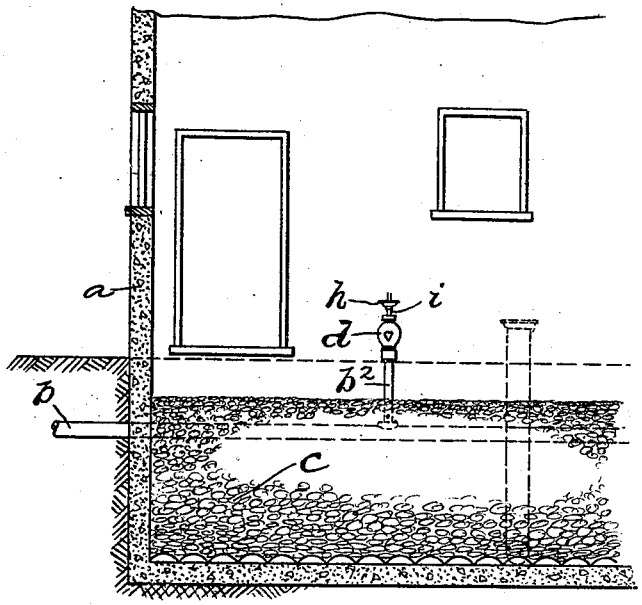
Fig. 1 is a sectional view of part of a filtering tank such as employed in a sewage purification system showing my apparatus in operative position.
Figure 2:
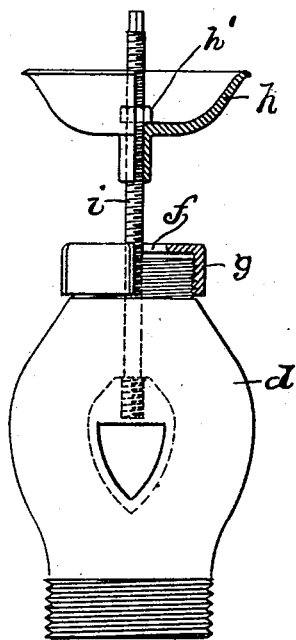
Fig. 2 is a relatively enlarged view of the principal parts of my invention, partly in elevation, and partly in section.
Figure 3:
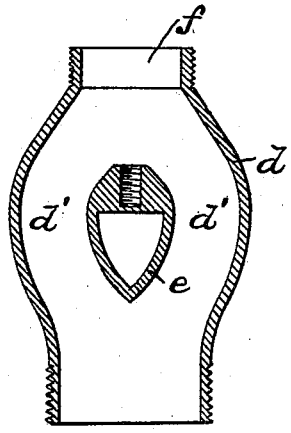
Fig. 3 is a longitudinal section of one detail.
Figure 4:
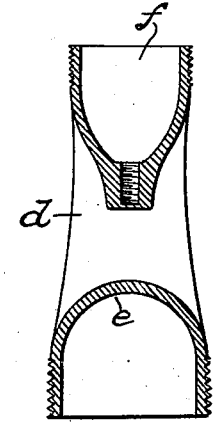
Fig. 4 is a longitudinal section of the same detail taken in a plane at right angles to the plane of the section shown in Fig. 3

$a$, represents the wall of a filtering tank in which the filtering bed $c$ is located. The particular formation of the filtering bed is immaterial to this invention, it being ordinarily composed of a proper material to obtain the desired filtering action. The filtering tank, of course, is provided with suitable air pipes and drain pipes, the same being customary and requiring no description herein. The sewage water is brought into the filtering tank by means of a suitable pipe $b$, which in this particular instance, runs below the surface of the filtering material $c$, and which is extended throughout the filtering bed so that spraying nozzles may be attached thereto at intervals in such a manner that the sewage water will be sprayed over substantially all of the bed, so that the action will be uniform and most efficient. In the drawings, I have illustrated in position only one of these nozzles, and this I will now describe. $b^2$, is a pipe which taps into the supply pipe $b$ and projects upwardly a proper distance above the bed of the filtering material. Mounted at the end of this pipe is my new and improved spraying device which is constructed in a novel manner so as to possess a number of marked advantages heretofore unattained in devices of this character. The spraying device comprises what I will term a head $d$. This is suitably secured to the upper end of the pipe $b^2$. The head $d$, is provided with two spaced water passages $d'—d'$ (Fig. 3). The partition $e$ between these passages is what I will term a breaker. This breaker in cross-section is best seen in Fig. 3, and it will be noted that the lower edge thereof is relatively sharp for the purpose hereinafter described. $f$ is an outlet. $g$ is a nipple arranged to screw onto the outlet end of the body $d$, said nipple being provided with a central opening of the desired size. $h$ is a deflector arranged directly above the outlet. This deflector is generally cup shaped as shown, and is adjustably mounted up and down upon the threaded stem or support $i$. This stem or support $i$ may be threaded into the upper end of the breaker $e$ so that it will pass centrally up through the outlet, thereby holding the deflector $h$ centrally with relation to the discharge of fluid through the outlet. $h'$ is a lock nut on the threaded stem $i$ for locking the deflector $h$ in the desired position of adjustment.

In operation, the sewage water is driven through the head $d$, and is deflected in opposite directions through the branch passages $d'—d'$. Above the breaker, the sewage waters come together so as to be discharged through the outlet in an upward direction, and so as to impinge against the underside of the deflector $h$ and be thereby broken up into spray and deflected laterally over a substantial area, the area being varied according to the water pressure and according to the adjustment of the deflector $h$ on the stem $i$. If there should be any solid particles in the water these will tend to be broken up by coming in contact with the relatively sharp lower edge of the breaker $e$, so that danger of clogging the outlet is practically eliminated.

I have shown my invention in its preferred form, but obviously some changes in construction and dimensions may readily be made without departing from the spirit and scope thereof. The construction has many advantages which will be appreciated by anyone skilled in the art. The body $d$ may be easily and cheaply cast, and requires but a minimum of machining. The deflector $e$ may likewise be cast and requires merely tapping to fit upon the screw $i$. While my invention is particularly applicable for the use described herein, I do not care to limit myself to this use exclusively since there may be many other connections in which such a spraying apparatus may be employed with great satisfaction.

What I claim is:—

1. In a spray device of the character described, a main body portion adapted for attachment to a pipe and comprising, an outer shell and a partition within said shell dividing the latter into two spaced apart curved ducts merging into each other above and below the partition, said partition being relatively sharp on the lower side for breaking up solid matter carried by the fluid through said body portion, a central stem secured to said partition and passing upwardly through the outlet end of said body portion, and a deflector adjustably mounted on said central stem for deflecting the fluid passing through said body portion.

2. In a combination as defined in claim 1, and a removable cap on the outlet end of said body portion and having an aperture therethrough whereby the flow of liquid through said body portion will be restricted.

BOYD WILKIE.